Patented Sept. 7, 1948

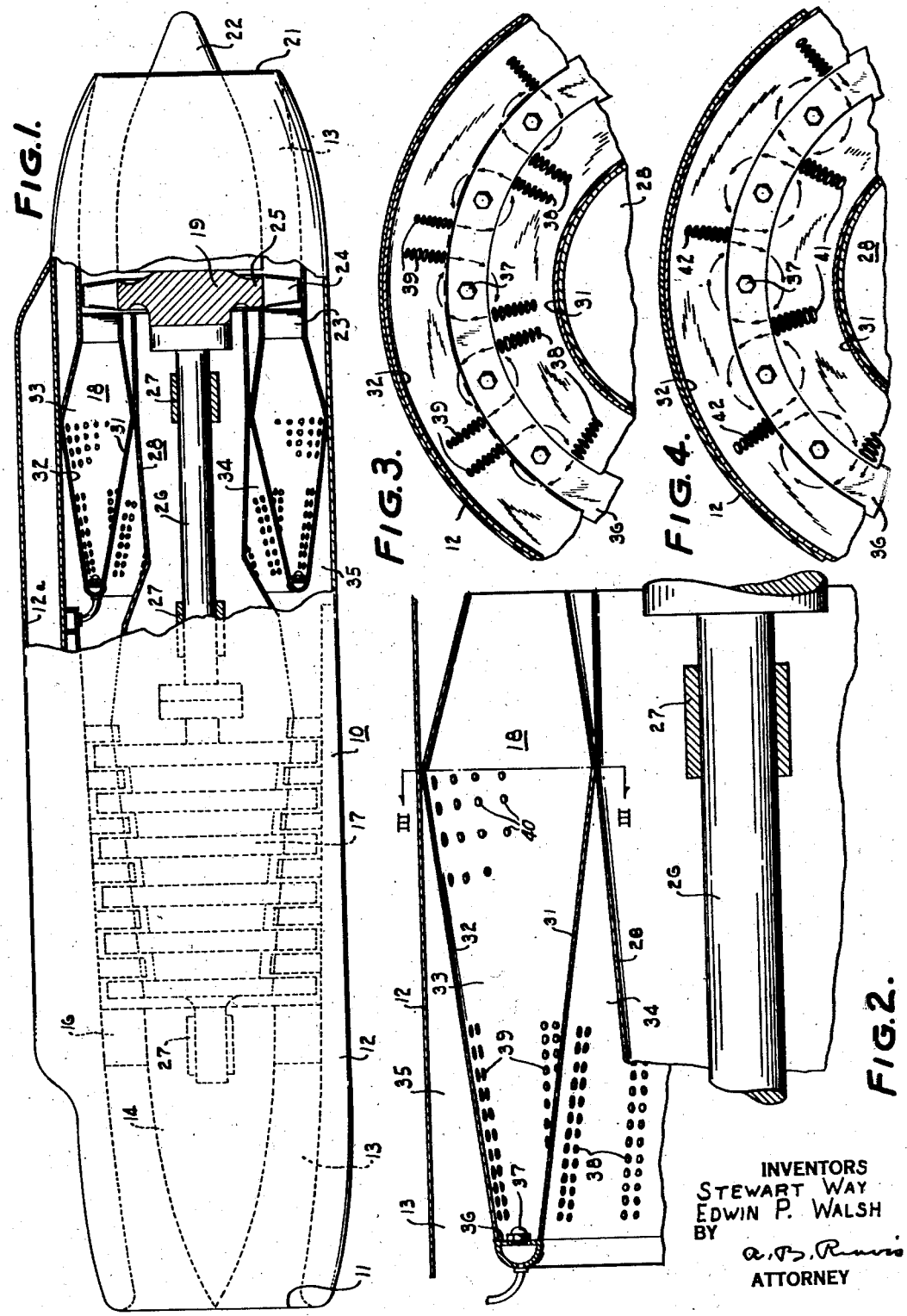

2,448,562

UNITED STATES PATENT OFFICE 2,448,562

COMBUSTION APPARATUS

Stewart Way, Churchill Borough, and Edwin P. Walsh, Boothwyn, Pa., assignors to Westinghouse Electric Corporation, East Pittsburgh, Pa., a corporation of Pennsylvania Application June 24, 1946, Serial No. 678,932

5 Claims. (Cl. 263—19)

This invention relates to combustion apparatus, more particularly to combustion chamber structure, and has for an object to provide novel structure of this character.

Another object of the invention is to provide a combustion chamber having a plurality of fuel admission nozzles together with a plurality of air admission openings in the chamber wall structure so disposed with respect to the nozzles that the air entering through said openings produces a vortex in the air and fuel mixture and combustion gases in the combustion space about the axis of each nozzle.

A further object of the invention is to provide a combustion chamber having a plurality of fuel admission nozzles together with a plurality of air admission openings in the chamber wall structure so disposed with respect to the nozzles that the air entering through said openings produces a vortex in the air and fuel mixture and combustion gases in the combustion space about the axis of each nozzle, with the vortices of adjacent nozzles rotating in opposite directions.

These and other objects are effected by the invention as will be apparent from the following description and claims taken in connection with the accompanying drawings forming a part of this application, in which:

Fig. 1 is a side elevational view of a gas turbine power plant incorporating the present invention, a portion of the outer casing and part of the inner structure being broken away to better illustrate the novel features;

Fig. 2 is an enlarged longitudinal sectional view of half of a combustion chamber such as shown in the power plant of Fig. 1;

Fig. 3 is a transverse sectional view, taken along the line III—III of Fig. 2, looking in the direction indicated by the arrows; and Fig. 4 is a sectional view, similar to Fig. 3, but showing a modified construction.

The present invention, although not limited thereto, is particularly adapted for use with a gas turbine power plant of the type employed on aircraft to drive the propeller or an electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and the turbine for heating the compressed air and which discharges the hot gases at a suitable temperture and pressure to the turbine. The gases on leaving the turbine are discharged through a nozzle provided at the rear of the casing and may aid in propelling the aircraft.

Referring now to the drawings more in detail, the power plant shown in Fig. 1, and indicated in its entirety by the reference character 10, is adapted to be mounted in or on the fuselage or wing of an aircraft with the left end or intake 11, as viewed in this figure, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial-flow compressor 17, combustion apparatus generally indicated 18, a turbine 19 which drives the compressor, and a nozzle 21 defined by the casing 12a and by a tail-piece 22, the latter being mounted concentrically in the casing and cooperating with the casing to provide the propulsion nozzle.

Air enters at the intake 11 and flows substantially straight through the plant, passing through the compressor 17, where its pressure is raised, and into the combustion apparatus 18, where it is heated. The hot gases, comprising the products of combustion and excess air heated by the combustion, on leaving the combustion apparatus are directed by suitable guide vanes or nozzles 23 against the blades 24 of the turbine disc 25, and then are discharged though the propulsion nozzle 21 to propel the aircraft.

By reference to Fig. 1, it will be seen that the compressor and turbine rotors are interconnected by means of a shaft 26 supported by suitable bearings 27 and enclosed by an inner wall structure, generally indicated 28, which protects the shaft and bearings from high temperatures and also defines a portion of the annular air flow passage 13 in which the combustion apparatus 18 is disposed.

The present invention is not limited to the specific details or arrangements of structure thus far described, but is primarily concerned with the combustion apparatus, indicated generally at 18.

A pair of frusto-conical inner and outer wall members 31 and 32, respectively, separate the annular flow passage 13, at the region of the combustion apparatus 18, into an annular burner or combustion space 33 overlapped both inwardly and outwardly by annular air spaces 34 and 35, respectively. The inner wall 31 is disposed with its base or larger end upstream and the outer wall 32 has its larger end or base downstream, with the result that the burner space 33 defined thereby increases in cross sectional area from its upstream end to its downstream end. Conversely, the inner and outer overlapping air spaces 34 and 35, the former defined by the walls 28 and 31 and the latter by the walls 12a and 32, decrease in cross sectional area from their upstream ends to their downstream ends.

Preferably, the upstream end of the burner space 33 is closed by an annular wall 36, in which is mounted an annular series of fuel nozzles 37 adapted to direct the fuel discharging therefrom downstream in directions parallel to the longitudinal axis of the power plant.

It has been found that if a vortex can be produced in the air and fuel mixture and combustion gases in the burner or combustion space about the axis of each nozzle, ignition and combustion will be improved with increase in the range of conditions of operation of an engine under which combustion can be maintained and made efficient. Previously, air has been admitted to the burner space from an overlapping air space or spaces through openings provided in the wall structure separating said burner space and said overlapping air space or spaces. However, to the best of applicants' knowledge, such air admission openings have been located without regard to their effect in producing vortices about the axes of individual nozzles.

The present invention provides axially-extending rows of openings 38 in the inner wall 31, so disposed as to admit air to the burner space in a general radial direction and only to the spaces between adjacent nozzles. Furthermore, these openings 38 admit air only to alternate spaces between adjacent burners. Conversely, similar rows of openings 39 are provided in the outer wall 32 and are so disposed as to admit radial streams of air only to those alternate spaces between nozzles to which air is not admitted by the openings 38 in the inner wall 31 (Fig. 3). As indicated by the arrows in this figure, each nozzle 37 receives two streams of air tangential thereto, the two tangential streams coming from opposite sides of the nozzle and being directed in opposite directions with the result that they produce a vortex about the nozzle axis. Furthermore, as indicated by the arrows in Fig. 3, the vortices of adjacent nozzles rotate in opposite directions, alternate vortices having clockwise rotation, and the remaining intermediate vortices having counterclockwise rotation.

As a result of this opposite rotation of adjacent vortices, each vortex acts as a sustaining or supporting boundary wall for its adjacent vortices. If adjacent vortices did not rotate in opposite directions, the turbulence resulting from their meeting edges moving in opposite directions would destroy such vortices almost before they could be formed. With opposite rotation of adjacent vortices, the meeting edges have, in effect, rolling action with respect to each other, thereby sustaining and promoting the vortical action.

If desired, additional openings 40 may be provided in the walls 31 and 32 downstream from the holes 38—39 for admission of so-called secondary air or of mixing and cooling air, or for other purposes.

In Fig. 4, there is illustrated a modification of the arrangement of Fig. 3, differing therefrom only in that each space between adjacent nozzles has air admitted thereto from only one row of openings, either openings 41 in the inner wall 31, or openings 42 in the outer wall 32, whereas in the construction of Fig. 3, two adjacent rows of openings 38 or 39 admit two streams of air to each space between adjacent nozzles.

It will be obvious that a single slot may be substituted for each row of openings 38, 39, 41 or 42.

While the invention has been shown in several forms, it will be obvious to those skilled in the art that it is not so limited, but is susceptible of various other changes and modifications without departing from the spirit thereof.

What is claimed is:

1. In combustion apparatus, wall structure defining a burner space and an overlapping air space, a plurality of spaced nozzles for admission of fuel sprays to said burner space, said wall structure being provided with a plurality of openings therethrough for passage of air from said overlapping air space to alternate spaces between adjacent fuel sprays within said burner space.

2. Structure as specified in claim 1, wherein the axes of said nozzles are parallel and said openings are arranged in straight rows admitting air in planes parallel to said axes and perpendicular to planes containing adjacent axes.

3. In combustion apparatus, wall structure defining an elongated combustion space and an overlapping air space, said wall structure being provided with uniformly-spaced longitudinally-extending rows of openings at the sides of said combustion space, a row of nozzles for admission of fuel sprays to said combustion space, said nozzles being uniformly spaced with alternate spaces opposite one of said rows of openings, whereby with air entering in planes perpendicular to the wall structure each elongated stream of air so entering through a row of openings passes between a pair of adjacent nozzles to impart vortical motion to the air and fuel mixture in the combustion space about the axis of each nozzle.

4. In combustion apparatus, inner and outer annular walls defining an annular combustion chamber, an annular end wall closing the upstream end of said combustion chamber, an annular row of uniformly-spaced nozzles associated with said upstream end of the combustion chamber with their axes parallel and directed longitudinally of said chamber, and said inner and outer annular walls being provided with a plurality of openings uniformly spaced circumferentially, the openings in said inner annular wall being circumferentially aligned with alternate spaces between nozzles, and the openings in said outer annular wall being circumferentially aligned with the remaining spaces between nozzles, whereby air entering the combustion chamber through said openings imparts vortical motion to the air and fuel mixture and combustion gases in said combustion chamber about the axis of each of said nozzles.

5. In combustion apparatus, wall structure defining an annular burner space and inner and outer overlapping annular air spaces, said structure including inner and outer annular walls separating said burner space from said inner and outer annular air spaces, respectively; an annular series of nozzles associated with said wall structure at the upstream end of said burner space and adapted to direct parallel streams of fuel longitudinally of said burner space; and means adapted to create a vortex of air and fuel mixture and combustion gases in said burner space about the axis of each of said nozzles, said means comprising said inner and outer walls provided with groups of openings adapted to admit air radially to said annular burner space from said overlapping annular air spaces, the groups of openings in the inner annular wall being staggered circumferentially with respect to the groups of openings in the outer annular wall and all of said groups of openings being staggered circumferentially relative to said nozzles, whereby streams of air entering said burner space flow tangentially relative to the longitudinal axes of the nozzles and impart vortical motion to the air and fuel mixture about said axes.

STEWART WAY.
EDWIN P. WALSH.

REFERENCES CITED

The following references are of record in the file of this patent:

UNITED STATES PATENTS

| Number | Name | Date |
|---|---|---|
| 2,110,209 | Engels | Mar. 8, 1938 |